United States Patent
Philippe

(10) Patent No.: US 9,976,451 B2
(45) Date of Patent: May 22, 2018

(54) INTERNAL COMBUSTION ENGINE

(71) Applicant: Benoit Laurent Philippe, Santa Cristina d'Aro Girona (ES)

(72) Inventor: Benoit Laurent Philippe, Santa Cristina d'Aro Girona (ES)

( * ) Notice: Subject to any disclaimer, the term of this patent is extended or adjusted under 35 U.S.C. 154(b) by 121 days.

(21) Appl. No.: 14/902,486

(22) PCT Filed: Jun. 30, 2014

(86) PCT No.: PCT/ES2014/070535
§ 371 (c)(1),
(2) Date: Jan. 8, 2016

(87) PCT Pub. No.: WO2015/001157
PCT Pub. Date: Jan. 8, 2015

(65) Prior Publication Data
US 2016/0138441 A1    May 19, 2016

(30) Foreign Application Priority Data

Jul. 2, 2013  (ES) .................................. 201330985

(51) Int. Cl.
*F01L 1/38* (2006.01)
*F01L 1/18* (2006.01)
(Continued)

(52) U.S. Cl.
CPC .................. *F01L 1/38* (2013.01); *F01L 1/181* (2013.01); *F01L 1/30* (2013.01); *F01L 7/02* (2013.01);
(Continued)

(58) Field of Classification Search
CPC ..... F01L 1/38; F01L 1/181; F01L 1/30; F01L 7/02; F01L 7/12; F01L 2105/00;
(Continued)

(56) References Cited

U.S. PATENT DOCUMENTS

| 779,116 A | 1/1905 | Bronder |
| 1,174,624 A * | 3/1916 | Seitz ..................... F02B 75/042 123/78 A |
| 1,485,483 A | 3/1924 | Chappell |
| 1,616,064 A | 2/1927 | Purdy |
| 2,139,457 A | 12/1938 | Patchett |

(Continued)

FOREIGN PATENT DOCUMENTS

| DE | 19637044 A1 | 4/1988 | |
| DE | 19637044 A1 * | 4/1998 | ................ F01L 1/44 |

(Continued)

OTHER PUBLICATIONS

Translation of Written Opinion for PCT/ES2014/070535.

*Primary Examiner* — Stephen K Cronin
*Assistant Examiner* — Scott A Reinbold
(74) *Attorney, Agent, or Firm* — Lucas & Mercanti, LLP

(57) ABSTRACT

There is provided an internal combustion engine, provided with a crankshaft and one or several cylinders provided on the wall thereof with exhaust ports and closed at the top by a cylinder head provided with intake ports; each cylinder accommodating an engine piston connected to the crankshaft and a coaxial auxiliary piston opposite the engine piston, defining an intake chamber and a combustion chamber; said auxiliary piston axially determining on the side of the combustion chamber a housing that communicates with the intake chamber via transfer ports, the housing of which includes a secondary piston which opens and closes the transfer ports in a back-and-forth movement between a rear position and a forward position.

12 Claims, 15 Drawing Sheets

(51) Int. Cl.
*F02B 75/04* (2006.01)
*F02D 15/04* (2006.01)
*F01L 1/30* (2006.01)
*F01L 7/02* (2006.01)
*F01L 7/12* (2006.01)
*F01L 1/08* (2006.01)

(52) U.S. Cl.
CPC ............... *F01L 7/12* (2013.01); *F02B 75/04* (2013.01); *F02B 75/042* (2013.01); *F02D 15/04* (2013.01); *F01L 1/08* (2013.01); *F01L 2105/00* (2013.01); *F01L 2820/02* (2013.01)

(58) Field of Classification Search
CPC ....... F01L 2820/02; F01L 1/08; F02B 75/042; F02B 75/04; F02D 15/04
USPC ......................................................... 123/294
See application file for complete search history.

(56) References Cited

U.S. PATENT DOCUMENTS

| | | | | |
|---|---|---|---|---|
| 2,316,790 A | * | 4/1943 | Hickey | ............... F01L 5/045 123/48 AA |
| 2,445,148 A | * | 7/1948 | Minnix | ............... F01L 1/44 123/66 |
| 2,535,532 A | * | 12/1950 | Dumanois | ............... F01L 1/352 123/21 |
| 4,169,435 A | | 10/1979 | Faulconer, Jr. | |
| 4,206,727 A | | 6/1980 | Siegien | |
| 2012/0085305 A1 | * | 4/2012 | Cleeves | ............... F01L 1/30 123/90.26 |

FOREIGN PATENT DOCUMENTS

| | | | | |
|---|---|---|---|---|
| GB | 191505587 A | | 3/1916 | |
| GB | 960054 A | * | 6/1964 | ............... F01L 5/04 |
| WO | 2009135274 A2 | | 11/2009 | |

\* cited by examiner

INTERNAL COMBUSTION ENGINE

CROSS REFERENCE TO RELATED APPLICATIONS

This Application is a 371 of PCT/ES2014/070535 filed on Jun. 30, 2014 which, in turn, claimed the priority of Spanish Patent Application No. P201330985 filed on Jul. 2, 2013, both applications are incorporated herein by reference.

FIELD OF APPLICATION

The present invention relates to an internal combustion engine, either compression-ignition or spark-ignition, with a two-stroke cycle and provided with a volumetric pump in order to assist the emptying and filling of the cylinder; wherein the volumetric cylinder is made up of an auxiliary piston with reciprocating motion placed in opposition to the engine piston, sharing the same cylinder.

STATE OF THE ART

Conventional two-stroke engines, with spark-ignition, are provided with a crankcase and pump to carry out the sweep/exhaust of residual combustion gases and intake/transfer of the fresh fuel/air mix. This system has the drawback that there is partial mixing between said residual gases and the fresh fuel/air mix, resulting in a fraction of said fresh fuel/air mix leaking into the exhaust, which is a determining factor of low performance, high consumption and polluting emissions, of this type of engine.

The U.S. Pat. No. 779,116, U.S. Pat. No. 1,616,064, U.S. Pat. No. 4,206,727 and WO 2009/135274 A3, describe such systems, essentially consisting of:

An engine piston/connecting rod/crankshaft assembly that conventionally uses the mechanical energy that is produced during the combustion and expansion of the fresh fuel/air mix.

A cylinder, in which the engine piston moves, this cylinder being provided with a side exhaust port, which opens when the engine piston uncovers it at the end of its expansion stroke.

A cylinder head that closes the cylinder at the upper portion thereof, which is provided with a number of intake ports with non-return valves.

An auxiliary piston placed in the same cylinder, between the cylinder head and the engine piston and in opposition thereto, this auxiliary piston being provided with a number of transfer ports with respective non-return valves.

This construction delimits:

A combustion chamber, between the lower face of the auxiliary piston, the upper face of the engine piston and the cylinder.

An intake chamber, between the lower face of the cylinder head, the upper face of the auxiliary piston and the cylinder.

The auxiliary piston is actuated by the side of the cylinder head such that it is synchronised with the engine piston, remaining immobile in the highest position thereof against the cylinder head during the essential part of the expansion stroke of the engine piston and completing a full reciprocating stroke during the rest of the functional cycle of the engine, whilst the engine piston uncovers the exhaust port at the end of the expansion stroke, until it performs the compression stroke. In order to perform a complete functional cycle, the crankshaft performs a complete turn (360°).

During the downward stroke, when it moves closer to the engine piston, the auxiliary piston simultaneously sweeps the residual gases from the combustion chamber to the exhaust and intakes the fresh fuel/air mix into the intake chamber, preventing the two from mixing.

During the upward stroke of the auxiliary piston, with the exhaust port now closed, the fuel/air mix progressively passes from the intake chamber to the combustion chamber through the open transfer ports when the valves thereof open.

At the end of the upward stroke of the auxiliary piston, the intake chamber contains a minimal volume, the fresh fuel/air mix having been transferred to the combustion chamber; and the engine piston moves closer to its top dead centre position, ready to start the combustion phase.

Despite the advantage of removing the fresh fuel/air mix leak towards the exhaust, characteristic of two-stroke engines with crankcase and pump, the constructive type described above nevertheless has some drawbacks that justify the disinterest of the industry up until today in these engines. These drawbacks are, for example:

The constructive complexity increases with respect to a conventional two-stroke engine, even becoming comparable to that of a four-stroke engine, whist no advantages in terms of performance are obtained with respect to the latter.

A spark plug or injector cannot be placed in the cylinder head, due to the presence of the auxiliary piston that separates the cylinder head from the combustion chamber at all times. It is for this reason that the spark plug or fuel injector are located laterally on the wall of the cylinder, which is unfavourable for homogeneous and complete combustion, with minimum levels of polluting emissions.

SUBJECT MATTER OF THE INVENTION

The present invention proposes a two-stroke internal combustion engine of the type previously stated, with a number of constructive solutions that fulfil the following objectives:

To locate a spark plug and/or fuel injector in the centre of the cylinder head in order to guarantee combustion quality that is in step with the current requirements.

To perform asymmetric stroke kinematics, a volumetric expansion movement greater than the volumetric compression movement, thus carrying out an Atkinson- or Miller-type thermodynamic cycle.

To directly regulate the engine power without throttling the intake, completely eliminating part load pumping losses that occur in conventional spark-ignition engines.

To obtain a compression ratio that varies depending on the engine load, in particular, decreasing from a maximum value at part load to a minimum value at full load, making it possible to optimise the thermodynamic performance in all conditions.

To obtain a constant expansion ratio in absolute value, regardless of the load, and as a result of the variable compression ratio, an expansion/compression quotient that increases from a unit value at part load to values of approximately 50% of over expansion at full load.

To optimise the operation mechanisms of the auxiliary piston and the components thereof, to fully control the intake, exhaust and transfer strokes, furthermore enabling operation at high revolutions.

The objective of locating a spark plug and/or a fuel injector in the cylinder head is achieved via a particular load transfer mechanism through the auxiliary piston.

According to the prior state of the art, the load transfer from the intake chamber to the combustion chamber is carried out by a number of ports in the auxiliary piston, the opening and closing of which is operated via a conventional valve, similar to those used in the intake and exhaust of four-stroke engines. This type of valve stays in a closed position (upwards) against the seat thereof, via the force of the spring, and is opened with a downwards movement, either passively, due to the pressure difference between the upper face and the lower face, thus overcoming the retention force of the spring, or through the mechanical operation of a cam. A valve of this type cannot remain in an open position during combustion, which makes it impossible for there to be direct communication between the cylinder head and the combustion chamber in the combustion phase in engines of this type.

In accordance with a first aspect of the present invention, the transfer valve is substituted with a piston (hereinafter referred to as secondary piston) fitting in a sealed manner in a cylindrical housing situated inside the auxiliary piston, where a reciprocating movement relative to said auxiliary piston may be carried out, in such a way that in the downward stroke this secondary piston obstructs a number of transfer ports located in the side wall of the housing in the auxiliary piston, and in the upward stroke it uncovers said ports, thus enabling the transfer of the load of fresh fuel/air mix between the intake chamber and the combustion chamber.

The movement of the secondary piston is, therefore, inverse to that of a conventional valve, since by being in a retracted position when it opens the transfer ports, said secondary piston does not burst into the combustion chamber and, as a result, may remain in this position during the combustion phase, thus making it possible to place a spark plug, a fuel injector and/or a glow plug in the combustion cylinder head just opposite one of the transfer ports, i.e. in a centred position with respect to the combustion chamber and in communication therewith.

With the secondary piston according to the invention, the seal between the intake and combustion chambers, in the position of closed transfer ports, is not achieved through contact on a seat as in conventional valves, but rather through the diameter of said secondary piston fitting to that of the housing thereof in the auxiliary piston, or by providing the secondary piston with one or several duly situated sealing rings.

This new operation kinematics for opening and closing the transfer ports is linked to an intake chamber whose dead volume is geometrically equal to zero, i.e. when the auxiliary piston is in its top dead centre position, it is in complete contact with the cylinder head, without leaving any remaining cavity, such that:

The total fresh load of fuel/air mix is transferred to the combustion chamber when the auxiliary piston reaches it top dead centre position.

The combustion cannot propagate towards the intake chamber, even when the transfer ports are open.

According to an additional aspect of the invention, the intake ports, which are found in the cylinder head, are provided with valves, each one of them determined by a flexible plate, the opening and closing of which are caused by the pressure difference between the intake collector and the intake chamber. Said plate valves have the advantage of occupying very little space and having extremely slight inertia.

In addition to the aforementioned with regards to the possibility of locating a fuel injector so that it acts directly in the combustion chamber in relation with the transfer ports of the auxiliary piston, an essential condition in the case of a compression-ignition engine (diesel), it is also possible in the case of a spark-ignition engine (Otto), locating it such that the fuel is injected in the intake chamber at any moment when the auxiliary piston is moving, for example during the intake stroke, giving time for the fuel to vaporise before the fresh fuel/air mix is transferred to the combustion chamber.

DETAILED DESCRIPTION OF THE INVENTION

Figure 1:
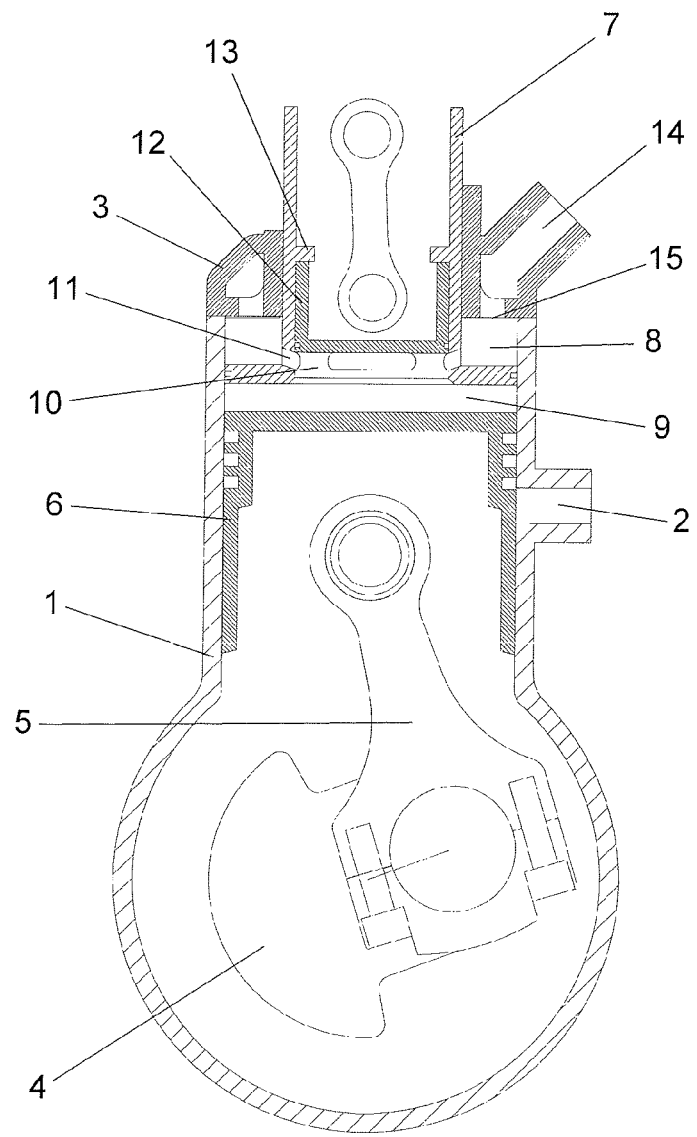
FIG. 1 shows a cross-section of an engine formed according to the invention, the functional assembly of which has an engine piston, an auxiliary piston and a secondary piston.

The object of the invention relates to a two-stroke internal combustion engine, formed by, as seen in FIG. 1, a cylinder (1) provided with an exhaust port (2) and closed at the top by a cylinder head (3), the lower portion of said cylinder (1) accommodating a crankshaft (4), to which an engine piston (6) is connected, via a connecting rod (5), whilst on the upper portion, passing through the cylinder head by means of a sliding mount, an auxiliary piston (7) is arranged that separates an intake chamber (8) and a combustion chamber (9).

The auxiliary piston (7) axially determines on the side of the combustion chamber a housing (10) that communicates with the intake chamber (8) via transfer ports (11), including in said housing (10), along with sealed fitting via one or more sealing rings (12.1), a secondary piston (12) which opens and closes the transfer ports (11) in a back-and-forth movement between an upward-facing rear position resting on a stop (13) and a downward-facing forward position. In the cylinder head (3) intake ports (14) are also defined, which are provided with respective non-return plate valves (15).

Figure 2A:
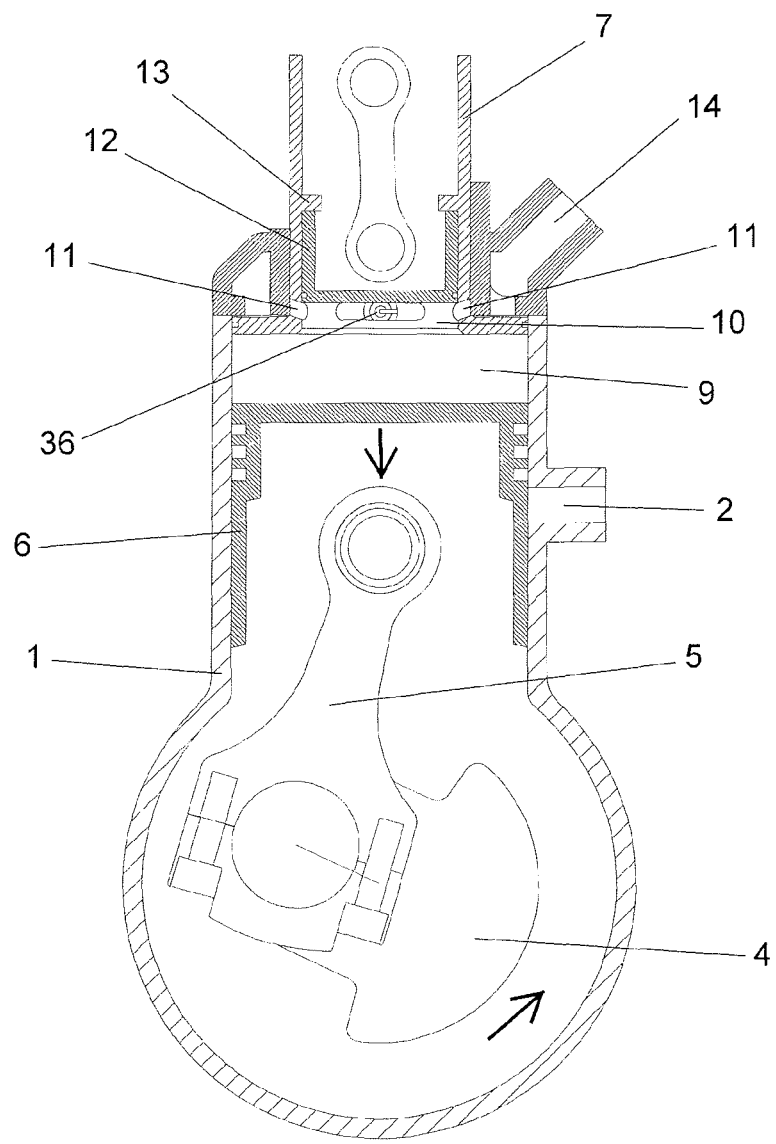
FIGS. 2A, 2B, 2C and 2D show the successive positions of the engine in the different phases of a functional cycle thereof.
Figure 7:
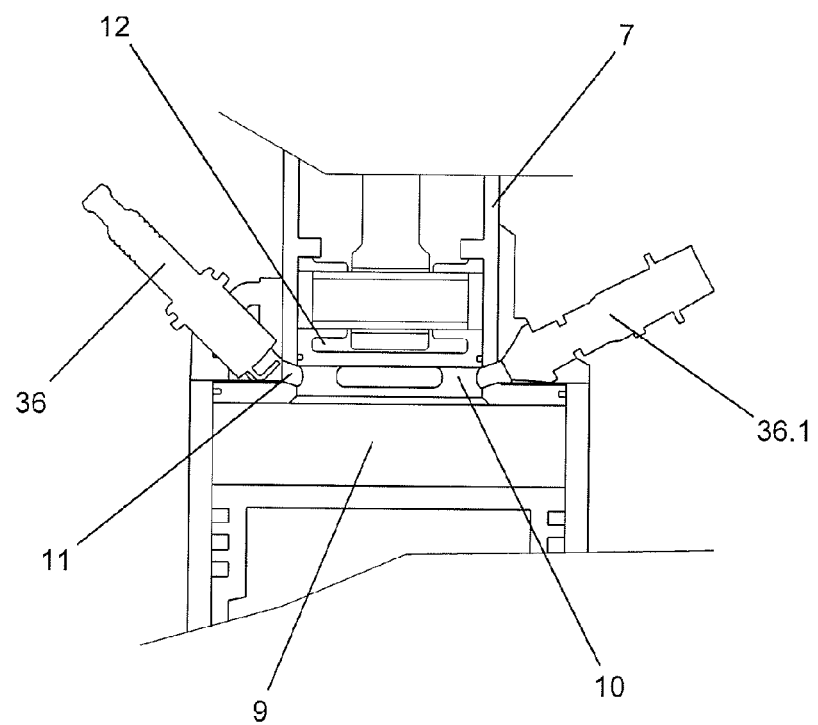
FIG. 7 is a detailed cross-section of the upper portion of an engine according to the invention, with a spark plug and fuel injector arranged in the closing cylinder head of the engine.

As such, the behaviour of the engine during the functional cycle is as follows:

During the combustion phase, until the exhaust port (2) opens due to the movement of the engine piston (6) to its bottom dead centre position, the auxiliary piston (7) and the secondary piston (12) remain immobile in their top position, the transfer ports (11) being open and the intake chamber at that moment having zero volume, as may be seen in FIG. 2A, in such a way that a spark plug (36) and/or, if applicable, a fuel injector (36.1) may be arranged opposite one of the transfer ports (11) and in communication with the combustion chamber (9), as may be seen in FIG. 7.

Figure 2B:
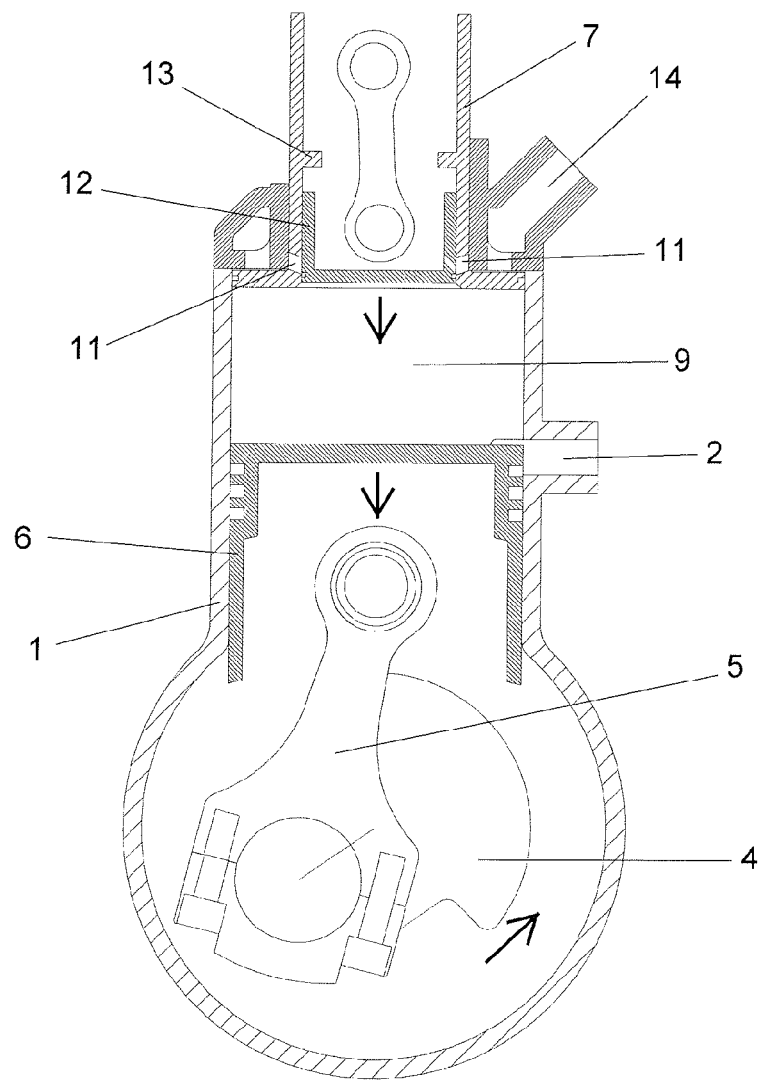

When the opening of the exhaust port (2) starts as the engine piston (6) moves closer to its bottom dead centre position, the secondary piston (12) moves downwards, causing the transfer ports (11) to close, as may be seen in FIG. 2B; and in these conditions the exhaust port (2) is opened, before the auxiliary piston (7) starts its downward stroke.

Figure 2C:
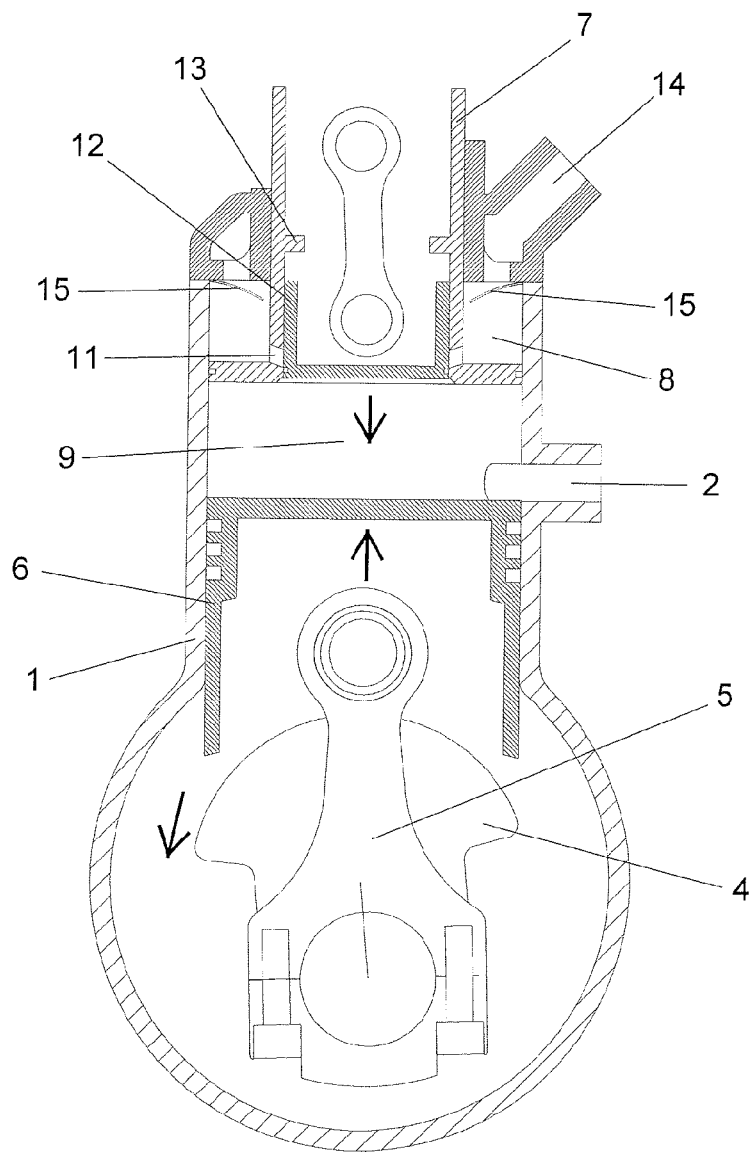

When the engine piston (6) reaches its bottom dead centre position, leaving the exhaust port (2) open, the auxiliary piston (7) moves downwards, simultaneously causing the sweeping of the residual gases from the combustion chamber (9) towards the exhaust port (2) and the intake of a new load of fresh fuel/air mix in the intake chamber (8) through the intake ports (14), the plate valves (15) being open, as may be seen in FIG. 2C. In these conditions, the secondary piston (12) keeps the transfer ports (11) closed during the entire exhaust phase whilst it follows the downward stroke of the auxiliary piston (7), thus preventing short-circuits of the fresh fuel/air mix with the residual gases, during the intake and sweep stage.

Figure 2D:
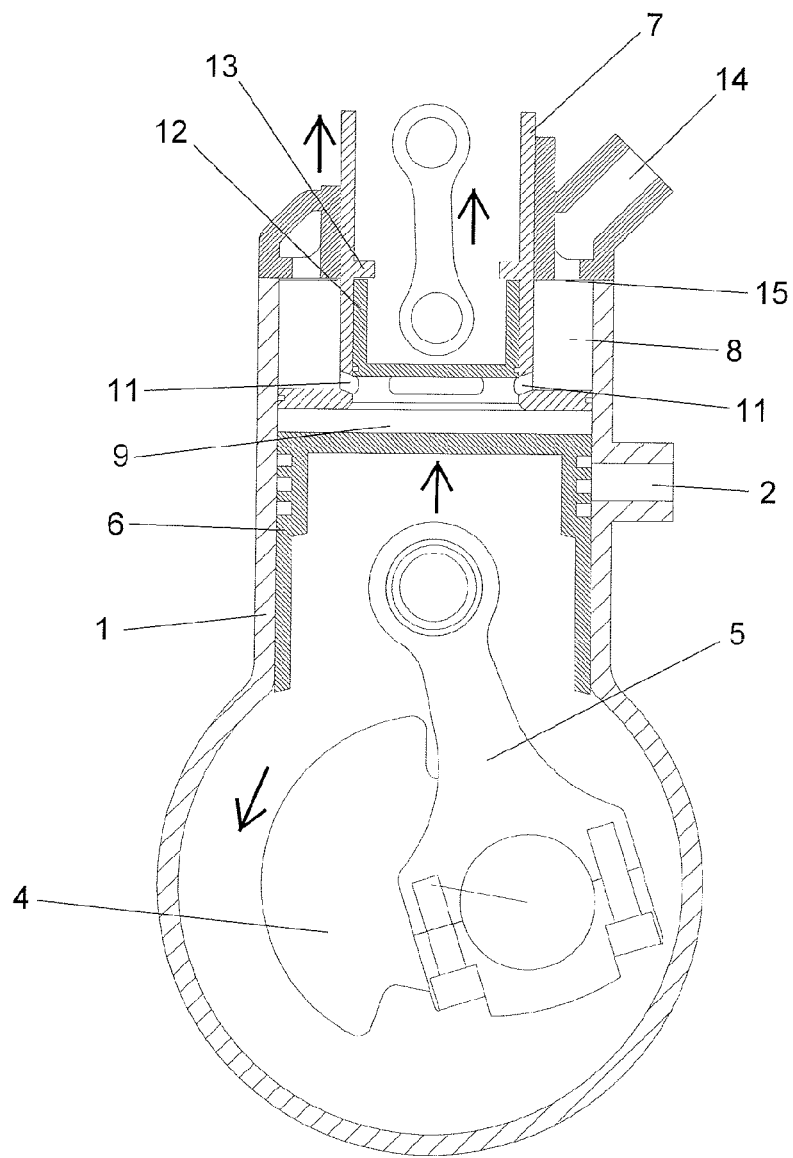
Figure 2E:
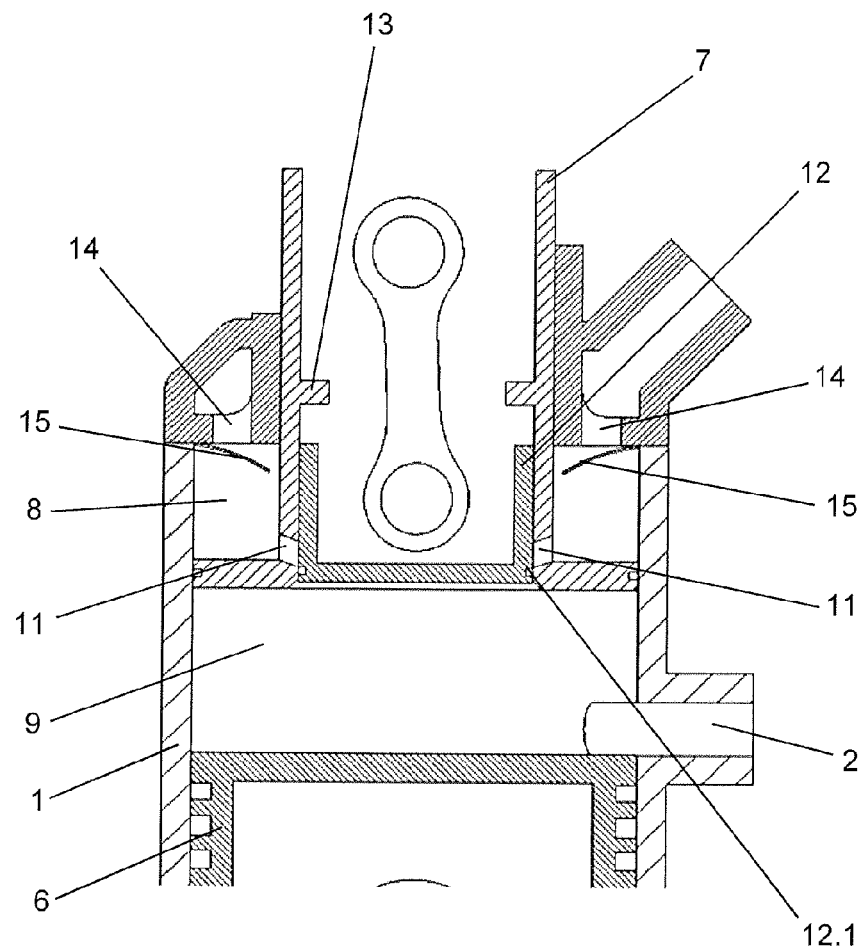
FIG. 2E is a detailed enlargement of the upper portion of FIG. 2C.

When the auxiliary piston (7) is in its bottom position, the engine piston (6) moves upwards and causes the exhaust port (2) to close, in such a way that, after the closing of the exhaust port (2) has occurred, the secondary piston (12) in turn moves upwards, opening the transfer ports (11), as may be seen in FIG. 2D; the subsequent upwards movement of the auxiliary piston (7) also occurring. The upwards stroke of the secondary piston (12) and the auxiliary piston (7) is produced by accompanying the engine piston (6) in the compression phase, in such a way that as the volume of the intake chamber (8) is gradually reduced until it reaches a value of zero, at the end of the stroke of the auxiliary piston (7), the entire fresh load of fuel/air mix is transferred towards the combustion chamber (9).

Figure 3:
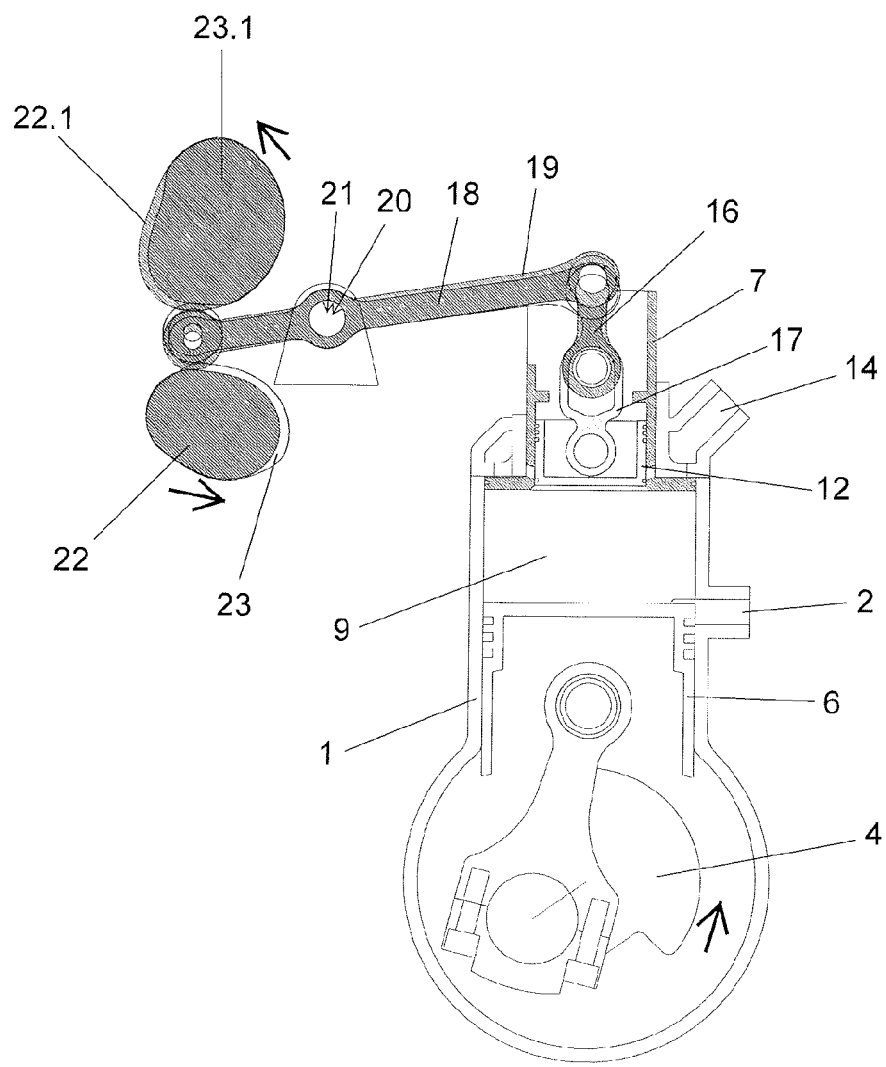
FIG. 3 shows a cross-section of the engine provided with a particular operation mechanism of the auxiliary piston and secondary piston assembly, which determines constant strokes of these pistons.
Figure 4A:
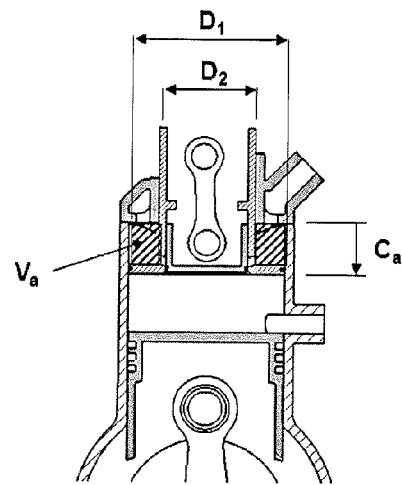
FIGS. 4A, 4B, 4C, 4D and 4E show the intake, sweep, expansion and compression volumes in an operation cycle of the engine, which determine asymmetric volumetric intake, compression and expansion displacements.
Figure 4B:
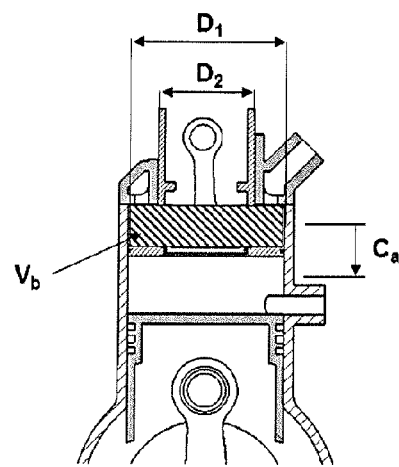
Figure 4C:
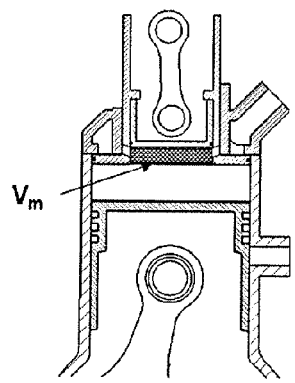
Figure 4D:
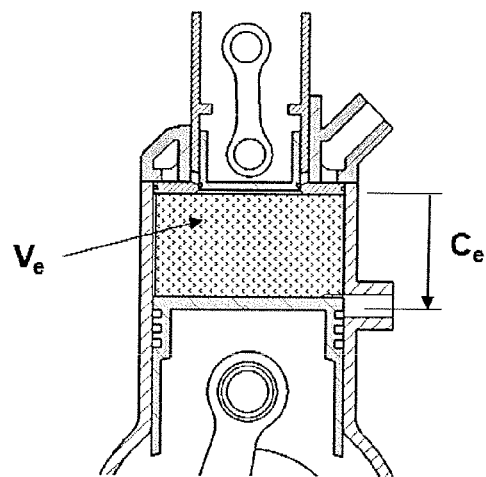
Figure 4E:
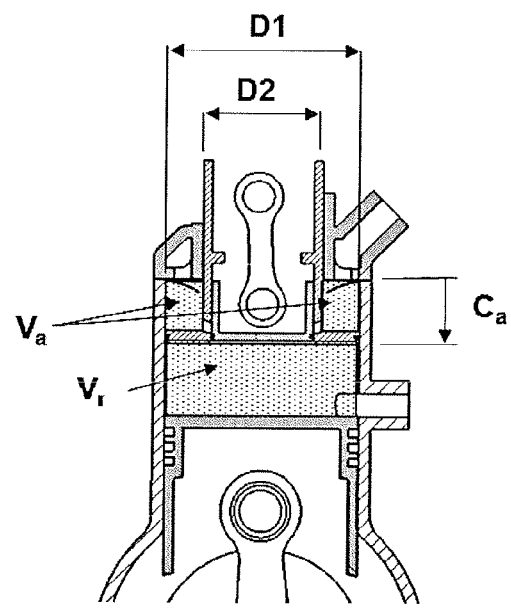

FIG. 3 shows an engine according to the invention, which functions in accordance with what has been explained above, being provided with a particular actuation mechanism of the assembly formed by the auxiliary piston (7) and the secondary piston (12), which each incorporate rods (16, 17) on the upper end thereof respectively, via which they are each joined, respectively, to one end of corresponding swivel arms (18, 19), the centres of rotation (20, 21) of which preferably coincide; said swivel arms (18, 19) being connected at the other end, to respective sets of cams (22, 22.1) and (23, 23.1) of the desmodromic type with complementary profiles, which induce a vertical reciprocating movement of the auxiliary piston (7) and the secondary piston (12) through said swivel arms (18, 19). Said cams (22, 22.1) and (23, 23.1) are actuated by the crankshaft (4) via a known transmission type (not shown) (chain, toothed belt, gears) with a ratio of 1:1. The desmodromic cams are more appropriate than a classic cam and spring system, due to the significant travel of the auxiliary piston (7) and the resulting inertia generated at high revolutions.

What follows is an explanation of how a compression ratio that is different to the expansion ratio is achieved, by adjusting the geometry of the auxiliary piston (7) and the secondary piston (12).

FIGS. 4A, 4B, 4C, 4D and 4E show the intake, sweep, expansion and compression volumes of the engine, wherein:

$$V_i = S_i \times \Pi (D_1^2 - D_2^2)/4 \qquad \text{Intake volume:}$$

$S_a$=auxiliary piston stroke.

$D_1$=large diameter or main diameter of the auxiliary piston (7), which, since it fits to the same cylinder (1) as the engine piston (6), is identical to that of the latter.

$D_2$=small diameter of the auxiliary piston (7), which passes through the cylinder head (3), representing the cross section of the auxiliary piston (7) exposed to the atmosphere (or to the prevailing pressure in the crankcase of the motor, as with the lower portion of the engine piston (6)).

$$V_s = S_i \times \Pi (D_1^2)/4 \qquad \text{Sweep volume:}$$

From which we may deduce that $V_i < V_s$ and that the larger the small diameter ($D_2$) of the auxiliary piston (7) the lower the intake volume with respect to the sweep volume.

$$V_e = S_e \times \Pi (D_1^2)/4 + V_D \qquad \text{Expansion volume:}$$

$S_e$=expansion stroke or engine piston stroke (6).
$V_D$=Dead volume=minimum volume of the combustion chamber, when the engine piston (6) and the auxiliary piston (7) are both at their top dead centre position.

Since the stroke of the engine piston (6) in the expansion phase is carried out whilst the auxiliary piston (7) is immobile in its high position, the expansion volume ($V_e$) always has a constant value regardless of the value of the stroke ($S_i$) of the auxiliary piston (7).

Therefore, the expansion ratio is constant, and equals:

$$\rho_e = V_e / V_D$$

A residual volume, which represents the fraction of the residual gases that is not swept by the auxiliary piston (7), since the maximum stroke of the latter is generally smaller than that of the engine piston (6) and is therefore recycled in the following cycle:

$$V_R = V_e - V_s$$

$$V_c = V_i + V_R \qquad \text{Compression volume:}$$

$$V_c = S_e \times \Pi (D_1^2)/4 - S_i \times \Pi (D_2^2)/4 + V_D$$

$$\rho_c = V_c / V_D \qquad \text{Compression ratio:}$$

One may observe that the compression ratio ($\rho_c$) is less than the expansion ratio ($\rho_e$), since the compression volume ($V_c$) is less than the expansion volume ($V_e$) by the quantity $S_i \times \Pi (D_2^2)/4$.

It is therefore the case that:

$$\rho_c / \rho_e = 1 - [S_a \times \Pi (D_2^2)/(S_e \times \Pi (D_1^2) + 4 V_D)]$$

In other words, the volumetric displacements are asymmetrical, thus defining an Atkinson-type thermodynamic cycle, meaning that having determined the respective strokes $S_e$ of the engine piston (6) and $S_i$ of the auxiliary piston (7) (the latter always being less than the former), the expansion is prolonged with respect to the intake by a factor that will depend on the ratio $D_1/D_2$, which is given by the geometry of the auxiliary piston (7). With a significant value for the small diameter $D_2$ of the auxiliary piston, of between 25% and 60% of the value of the large diameter $D_1$, an expansion factor of between 1.15 and 1.5 times the compression is obtained.

Another consequence of said unique geometry of the auxiliary piston (7) is that during the compression stroke said auxiliary piston (7) returns positive work through its actuation mechanism formed by the assembly of desmodromic cams (22, 22.1; 23, 23.1) illustrated in FIG. 3.

During the compression stroke, regardless of the load, the engine piston (6) requires (negative) work equivalent to:

$$\int_{1-2} P dV, \text{ with } V_1 - V_2 = S_e \times \Pi(D_1^2)/4$$

Meanwhile, due to the balance of pressures between the combustion chamber (9) and the intake chamber (8), during the compression stroke, the auxiliary piston (7) returns (positive) work equivalent to:

$$\int_{1'-2'} P dv, \text{ with } V_{1'} - V_{2'} = S_i \times \Pi(D_2^2)/4$$

Therefore, the net work required for the compression stroke is:

$$\int_{1-2} P dV - \int_{1'-2'} P dv$$

Another aim of the present invention is to completely control the load of the engine by means of a variable-stroke actuation of the auxiliary piston (7) and secondary piston (12) assembly. Thus, since it can carry out a volumetric intake displacement that is exactly equal to the load volume needed for the required engine power, the following improvements are obtained over a conventional four-stroke engine (in particular Otto-type engines):

Since a throttle valve is not required to modify the power, the losses due to pumping at part load are completely eliminated, substantially improving the performance in said conditions.

Compared to four-stroke spark-ignition engines—which exhibit a reduction in the effective compression ratio at part load because the chamber is not filled to atmospheric pressure, causing a loss in thermodynamic performance associated with a decline in combustion quality—in the engine with an auxiliary piston and an asymmetric and variable stroke according to the invention, when the piston performs a stroke lower than the maximum, it also reduces, by the same proportion, the sweeping of residual gases from the previous combustion, but the residual gases remain in the combustion chamber and are recycled by adding them to the fresh load of fuel/air mix in the following cycle, such that the effective compression ratio is not reduced at part load. What is also achieved is a stratification between the recycled portion of the residual gases and the fresh portion of the fuel/air mix (preventing them from mixing), by progressively letting in fresh fuel/air mix throughout the entire compression stroke. All of this makes it possible to maintain high combustion quality and thermodynamic performance, under any conditions.

Moreover, by associating the geometry of asymmetric volumetric displacements with a variable-stroke actuation, it becomes possible to modify the compression ratio as a function of the load.

The law that relates the compression ratio to the expansion ratio, $$\rho_c/\rho_e = 1 - [S_i \times \Pi(D_2^2)/(S_e \times \Pi(D_1^2) + 4V_D)]$$

in this case has a variable $S_i$ value that is directly proportional to the engine load.

Therefore:

$\rho_c/\rho_e = 1$ when $S_i = 0$, or in other words when the auxiliary piston (7) is not pumping anything.

$\rho_c/\rho_e < 1$, if $S_i > 0$, or in other words the compression ratio decreases whilst the intake stroke ($S_i$) (i.e. the load) increases, passing from a conventional Otto cycle to a Miller or Atkinson cycle where expansion is proportionally longer than compression.

In this way, with the engine according to the present invention, it is possible to have:

A high compression ratio ($\rho_c$) at low loads, compatible with the maximum pressure permitted for the mechanical resistance of the moving components of the engine, and also compatible with the auto-ignition limit when it is a gasoline engine, since this limit is determined not only by the pressure, but also by the temperature in the combustion chamber (9), which is obviously less at part load.

A compression ratio ($\rho_c$) that decreases as the load increases, making it possible to contain the maximum combustion pressure and create a thermodynamic cycle wherein the expansion is greater than the compression, in other words a Miller or Atkinson cycle, whose performance is superior to that of a conventional Otto cycle.

It may likewise be seen that the larger the small diameter ($D_2$) with respect to the large diameter ($D_1$) of the auxiliary piston (7), the greater the variation in the compression/expansion ratio in association with the variable stroke of the auxiliary piston (7). Thus, the design of the auxiliary piston (7) of an engine according to the invention, in particular regarding the ratio between the large diameter ($D_1$) and the small diameter ($D_2$) of the auxiliary piston (7), the variation in its stroke ($S_i$) and the value of the dead volume ($V_D$), make it possible to adjust and optimise the thermodynamic behaviour to function as an Otto engine, as a diesel engine, as a stationary engine, as a car engine with a wide load range, etc.; likewise making it possible to reduce the level of nitrogen oxide emissions, in particular in a spontaneous ignition engine (diesel).

Figure 5:
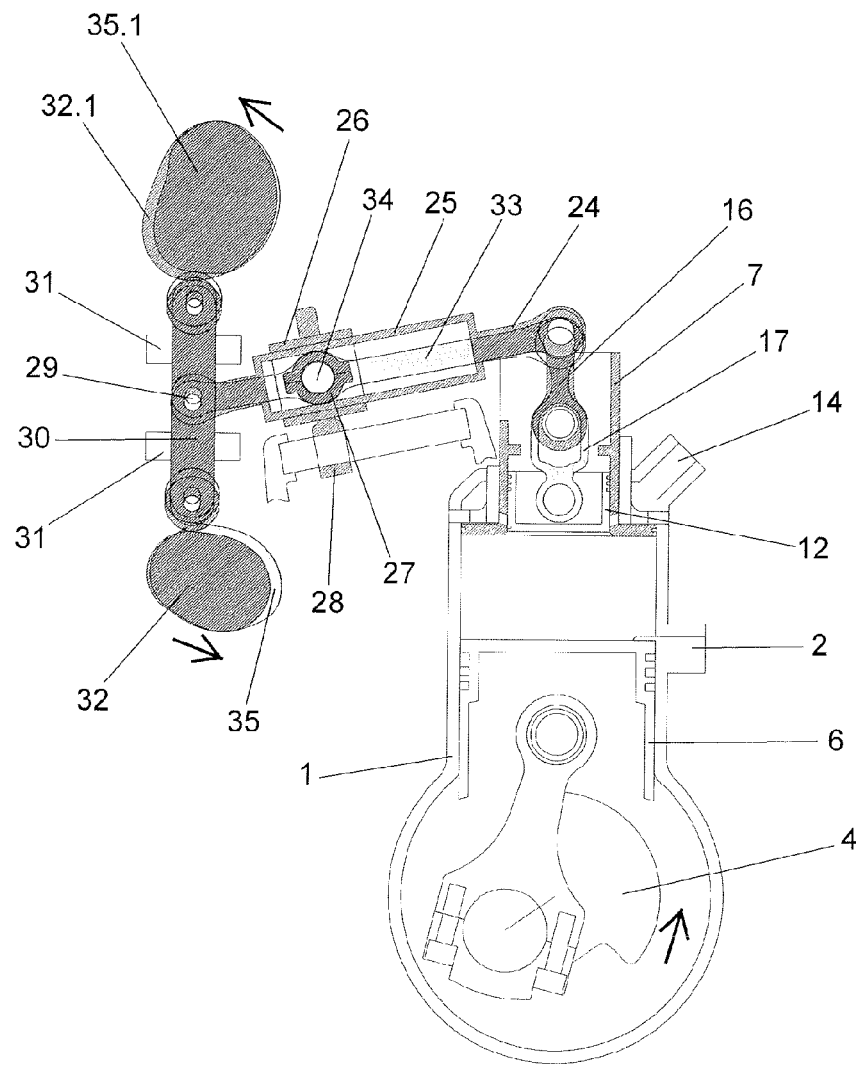
FIG. 5 shows a cross-section of the engine provided with an actuation mechanism of the auxiliary piston and the secondary piston, which determines variable strokes of these pistons.

FIG. 5 shows an engine that also falls within the object of the invention, provided with a particular actuation mechanism of the auxiliary piston (7) and of the secondary piston (12) with a variable stroke, which achieves the aims described above. The auxiliary piston (7) is connected by means of a small connecting rod (16) to one end of a main swivel arm (24), which is provided with a hollow cylindrical portion (25) upon which there is a sleeve (26) capable of carrying out a sliding movement all along said hollow cylindrical portion (25). The sleeve (26) is mounted on an articulated joint (27) enabling oscillating movements of the assembly of said sleeve (26) and the main swivel arm (24). Meanwhile, the assembly of the sleeve (26) and the articulated joint (27) is joined to a sliding support (28), which can move linearly and in parallel to the axis of the hollow cylindrical portion (25) of the main swivel arm (24), when the auxiliary piston (7) is in its top dead centre position. This condition is crucial for the auxiliary piston (7) to be able to reach the same top dead centre position regardless of the value of its stroke.

The other end of the main swivel arm (24) is connected by means of an articulated joint (29) to a plunger (30) placed in a position that is approximately parallel to the cylinder (1) of the engine, said plunger (30) being mounted in guides (31), such that it can carry out a linear back-and-forth movement produced by a set of desmodromic cams (32, 32.1) situated in contact with the ends thereof, and which are actuated by the engine crankshaft (4).

The back-and-forth motion of the plunger (30) is transmitted to the auxiliary piston (7) through the swivel arm (24), with a variable reduction ratio depending on the position of the sleeve (26) with the sliding support (28), causing said auxiliary piston (7) to carry out a stroke with a variable range. In this way it is possible to achieve, for example, a continuous variation of between 10% and 100% of the maximum stroke of the auxiliary piston (7).

The set of desmodromic cams (32, 32.1), which produces the movement of the auxiliary piston (7), has the advantage over other possible mechanisms that it can efficiently recover the positive work done by said auxiliary piston (7) during the stroke of the compression phase of the engine.

Moreover, the secondary piston (12) is connected by means of another small connecting rod (17) to one end of a secondary swivel arm (33), which is located inside the hollow cylindrical portion (25) of the main swivel arm (24), with a respective articulated joint therein (34), the other end of this secondary swivel arm (33) being connected, by means of a respective articulated joint, to a corresponding plunger (30.1) parallel to plunger (30) and which is in turn mounted in sliding guides, likewise being able to carry out a back-and-forth movement actuated by a set of desmodromic cams (35, 35.1) that act upon the ends thereof.

Since its articulated joint (34) is inside the hollow cylindrical portion (25) of the main swivel arm (24), the secondary swivel arm (33) transmits to the secondary piston (12), simultaneously, the stroke movement of the auxiliary piston (7) and its stroke relative to the same, by virtue of the actuation carried out by the cams (35, 35.1).

Figure 5A:
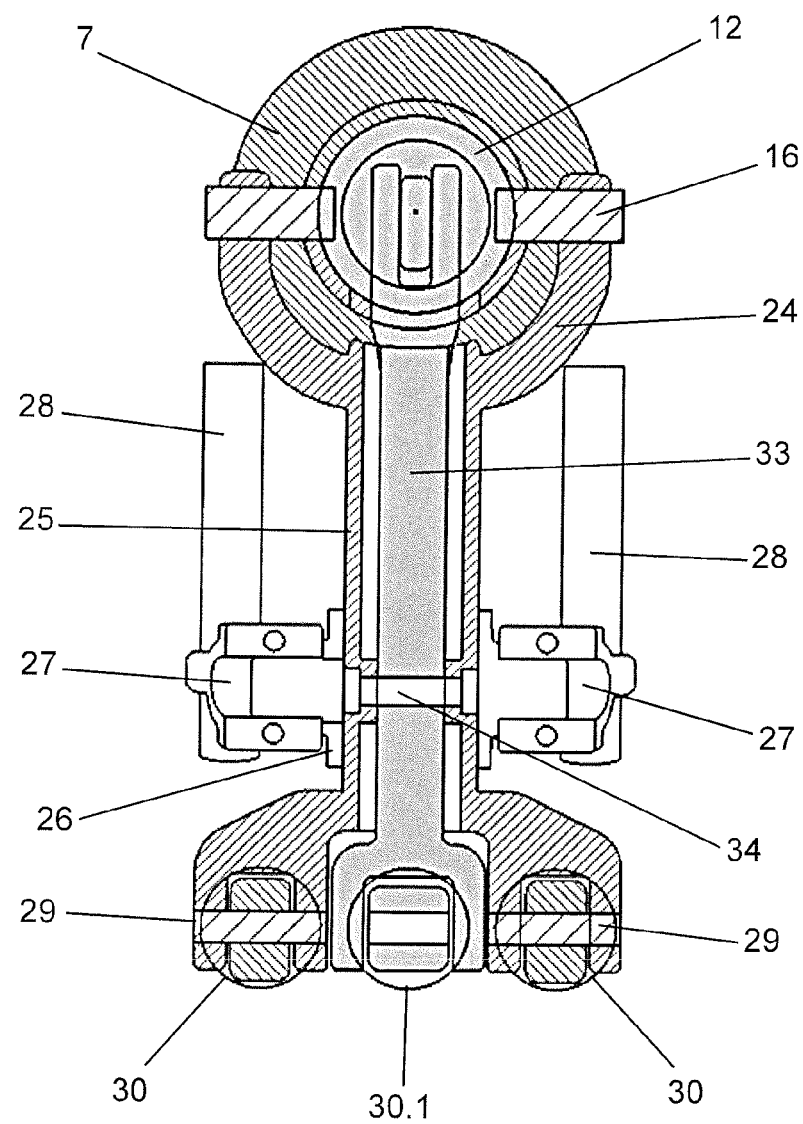
FIG. 5A shows an enlarged top view of a longitudinal cross-section of the swivelling assembly of the previous figure.

FIG. 5A shows how in practice, for the purpose of balancing the stress generated in the swivel arm (24), the plunger (30) has been doubled into two elements placed symmetrically with respect to the secondary swivel arm (33) and its corresponding plunger (30.1).

Figure 6A:
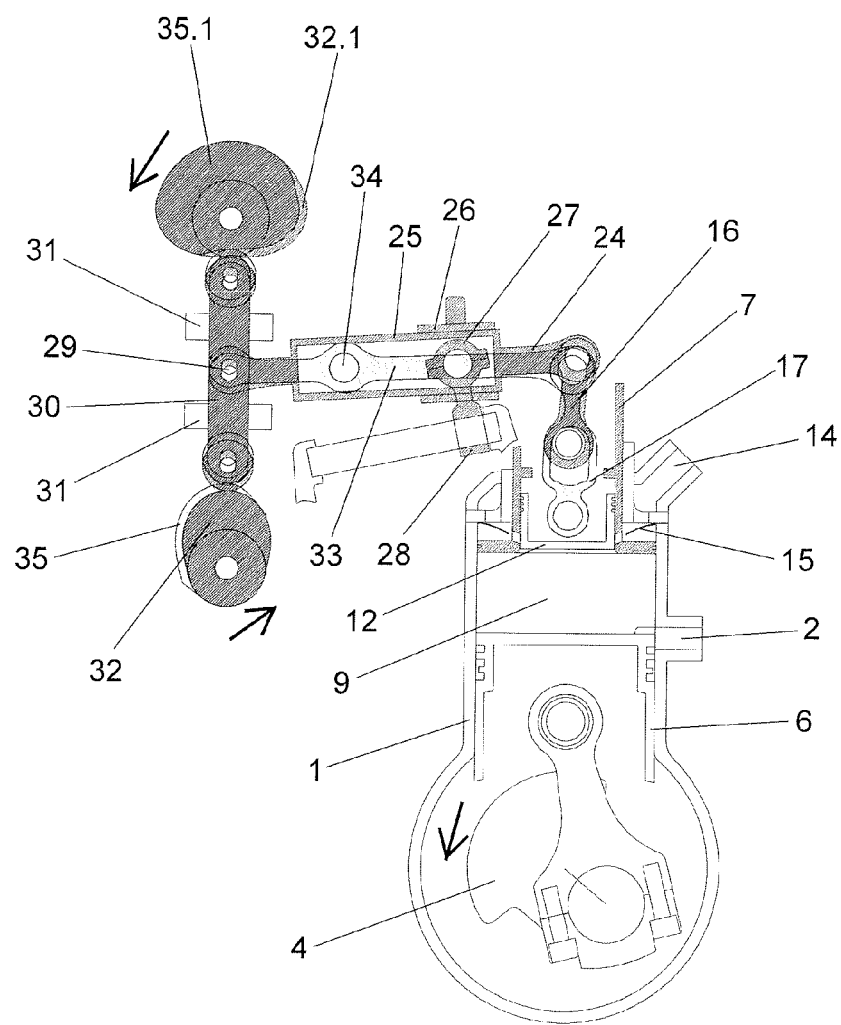
FIGS. 6A, 6B and 6C show the engine in FIG. 5 in different operational positions.
Figure 6B:
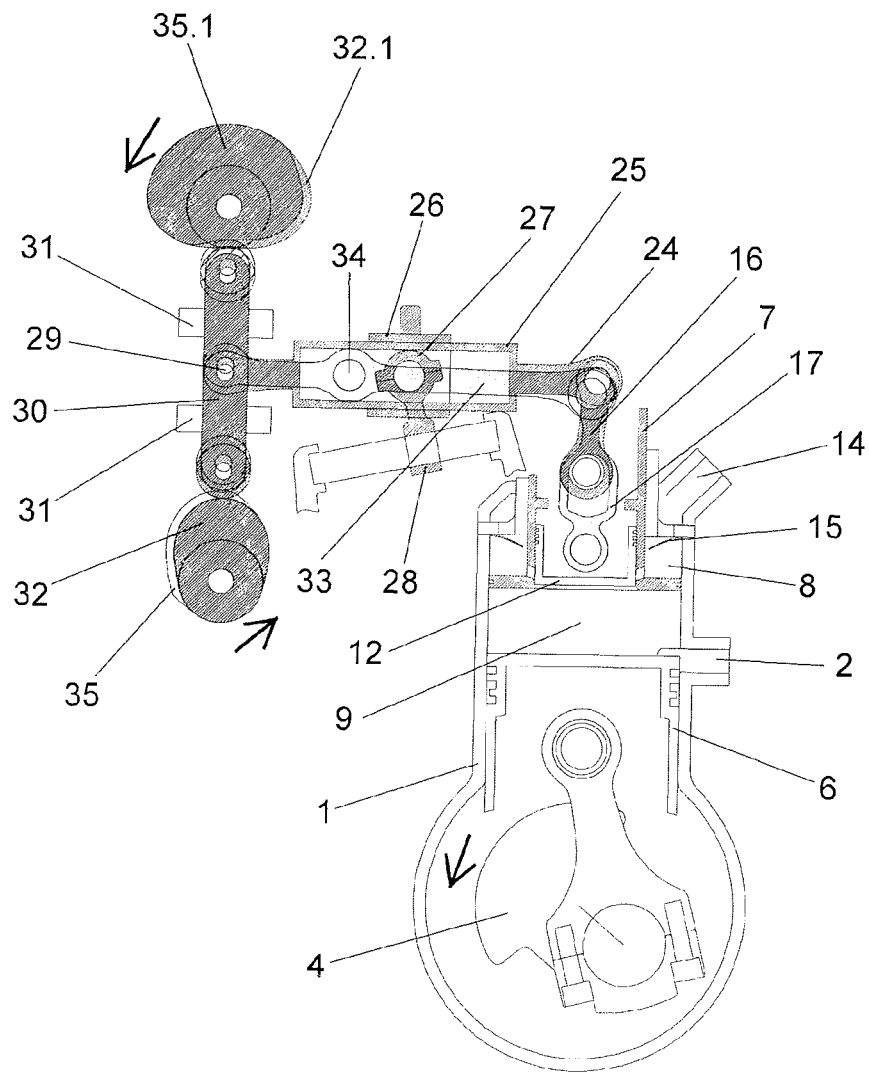
Figure 6C:
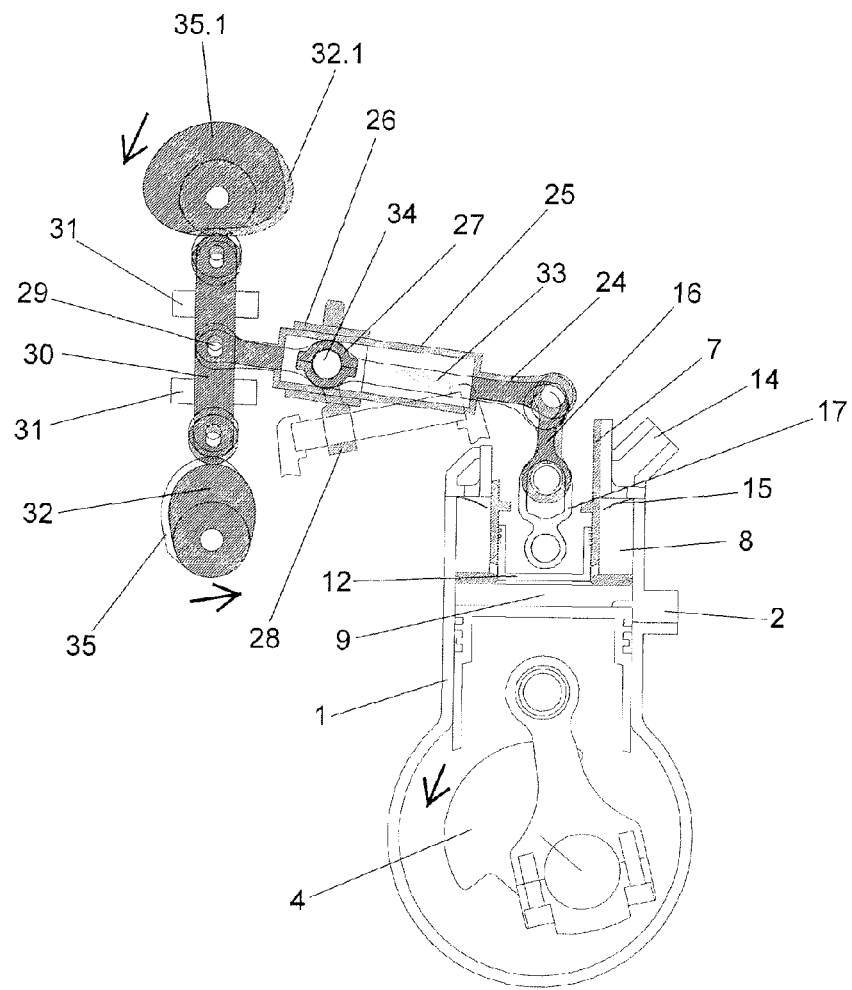

FIGS. 6A, 6B and 6C show said engine of FIG. 5, with the auxiliary piston (7) in positions at 25, 50 and 100%, respectively, of the intake load of fresh fuel/air mix in the engine, and the corresponding position in each case of the sleeve (26) with the sliding support (28). Said positions are determined by the accelerator control of the engine (not shown).

Having set the large diameter ($D_1$) of the auxiliary piston (7), the fact of increasing the small diameter ($D_2$) of said auxiliary piston (7) is favourable for the features that improve the performance throughout the range of powers, i.e. reduce the compression ratio and increase the expansion/compression quotient as the load increases. However, it has the drawback of reducing the effective displacement, in other words the specific power of the engine. In order to counteract this drawback, the engine may be equipped with a turbocharger, the turbine of which is connected to the exhaust port (2) in order to be driven by the exhaust gases, whilst the compressor, which is operated by said turbine, is connected to the intake ports (14).

Thanks to the auxiliary piston (7), which perfectly separates the combustion chamber (9) from the intake chamber (8), thus preventing any short-circuits of the fresh fuel/air mix load towards the exhaust, the total fluid driven by the turbocharger is retained in the engine and carries out positive work during the intake stroke if there is sufficient supercharged pressure, which provides performance improvement with respect to a semi-diesel-type two-stroke engine, where the sweeping of the exhaust gases and the intake of the fresh fuel/air mix is carried out via an outer volumetric compressor or a turbocharger, operating with the exhaust and intake ports which are open simultaneously and in communication.

For simplicity, the previous descriptions and illustrations of the drawings show an engine with a single cylinder (1), but the features of the invention may be applied likewise to an engine with multiple, inline or V cylinders, etc.

The invention claimed is:

1. An internal combustion engine, comprising:
a crankshaft; and
one or several cylinders,
 each cylinder comprises an engine piston joined to the crankshaft which performs a reciprocating motion inside the cylinder;
a cylinder head that closes an upper portion of the one or several cylinders comprising intake ports;
exhaust ports located on a wall of the one or several cylinders; and
a coaxial auxiliary piston opposite the engine piston, delimiting a combustion chamber between said auxiliary piston, the cylinder and the engine piston, and an intake chamber between said auxiliary piston, the cylinder and the cylinder head, said auxiliary piston is provided with a reciprocating motion mechanically synchronized with the engine piston in order to cause expulsion of residual gases from the combustion chamber through an exhaust port and simultaneously cause intake of a fresh load of fuel/air mix in the intake chamber through the intake ports;
a housing that communicates with the intake chamber through transfer ports, the housing being axially located on a side of the combustion chamber;
a secondary piston included in said housing which opens and closes the transfer ports in a back-and-forth movement, respectively between an upward rear position and a downward forward position.

2. The internal combustion engine, according to claim 1, wherein the secondary piston is adjusted with a seal with respect to the wall of the housing via a number of sealing rings.

3. The internal combustion engine, according to claim 1, wherein a spark plug and/or a fuel injector are arranged in the cylinder head, opposite one of the transfer ports and in communication with the combustion chamber when the auxiliary piston is in its position closest to the cylinder head.

4. The internal combustion engine, according to claim 1, wherein the intake ports are provided with a number of non-return plate valves.

5. The internal combustion engine, according to claim 1, wherein the auxiliary piston passes through the cylinder head by means of a sliding mount.

6. The internal combustion engine, according to claim 1, wherein the auxiliary piston has a large diameter ($D_1$) that fits the inside of the cylinder and a small diameter ($D_2$) that passes through the cylinder head and is greater than one fourth of the large diameter ($D_1$).

7. The internal combustion engine, according to claim 1, wherein the auxiliary piston is arranged connected to one end of a swivel arm, which is connected at the other end to a set of cams of the desdromic type that cause a swivelling movement of said swivel arm; the secondary piston is arranged connected to one end of another swivel arm, which is connected at the other end thereof to a respective set of cams of the desdromic type that in turn cause a swivelling movement of this swivel arm.

8. The internal combustion engine, according to claim 1, wherein the reciprocating motion of the auxiliary piston, mechanically synchronised with the engine piston, has a variable range or stroke.

9. An internal combustion engine, comprising:
a crankshaft; and
one or several cylinders,
   each cylinder comprises an engine piston joined to the crankshaft which performs a reciprocating motion inside the cylinder;
a cylinder head that closes an upper portion of the one or several cylinders comprising intake ports;
exhaust ports located on a wall of the one or several cylinders; and
a coaxial auxiliary piston opposite the engine piston, delimiting a combustion chamber between said auxiliary piston, the cylinder and the engine piston, and an intake chamber between said auxiliary piston, the cylinder and the cylinder head, said auxiliary piston is provided with a reciprocating motion mechanically synchronized with the engine piston in order to cause expulsion of residual gases from the combustion chamber through an exhaust port and simultaneously cause intake of a fresh load of fuel/air mix in the intake chamber through the intake ports;
a housing that communicates with the intake chamber through transfer ports, the housing being axially located on a side of the combustion chamber;
a secondary piston included in said housing which opens and closes the transfer ports in a back-and-forth movement, respectively between an upward rear position and a downward forward position,
wherein the auxiliary piston and the secondary piston are arranged connected to a mechanism that enables the stroke of the upwards and downwards reciprocal movements thereof to be modified, the auxiliary piston being connected to one end of the main swivel arm, which is connected at the other end to a plunger that is actuated in an upwards and downwards movement by a set of desmodromic cams, said main swivel arm having a hollow cylindrical portion, a sliding sleeve mounted on an articulated joint joined to a sliding support that enables a linear movement in a direction parallel to the axis of the hollow cylindrical portion of the main swivel arm when the latter is in the position determined by the position of the auxiliary piston closest to the cylinder head; the secondary piston is connected to one end of a secondary swivel arm, which is connected at the other end thereof to a respective plunger parallel to the plunger and that is in turn actuated in an upwards and downwards movement by a corresponding set of desmodromic cams, this the secondary swivel arm being mounted on an articulated joint that is located inside the hollow cylindrical portion of the main swivel arm.

10. The internal combustion engine, according to claim 1, wherein it is provided with a turbocharger, the turbine of which is connected to the exhaust port and the compressor of which is connected to the intake ports.

11. The internal combustion engine, according to claim 5, wherein the auxiliary piston has a large diameter ($D_1$) that fits the inside of the cylinder and a small diameter ($D_2$) that passes through the cylinder head and is greater than one fourth of the large diameter ($D_1$).

12. An internal combustion engine, comprising:
a crankshaft; and
one or several cylinders,
   each cylinder comprises an engine piston joined to the crankshaft which performs a reciprocating motion inside the cylinder;
a cylinder head that closes an upper portion of the one or several cylinders comprising intake ports;
exhaust ports located on a wall of the one or several cylinders; and
a coaxial auxiliary piston opposite the engine piston, delimiting a combustion chamber between said auxiliary piston, the cylinder and the engine piston, and an intake chamber between said auxiliary piston, the cylinder and the cylinder head, said auxiliary piston is provided with a reciprocating motion mechanically synchronized with the engine piston in order to cause expulsion of residual gases from the combustion chamber through an exhaust port and simultaneously cause intake of a fresh load of fuel/air mix in the intake chamber through the intake ports;
a housing that communicates with the intake chamber through transfer ports, the housing being axially located on a side of the combustion chamber; a secondary piston included in said housing which opens and closes the transfer ports in a back-and-forth movement, respectively between an upward rear position and a downward forward position,
wherein the reciprocating motion of the auxiliary piston, mechanically synchronized with the engine piston, has a variable range or stroke,
wherein the auxiliary piston and the secondary piston are arranged connected to a mechanism that enables the stroke of the upwards and downwards reciprocal movements thereof to be modified, the auxiliary piston being connected to one end of the main swivel arm, which is connected at the other end to a plunger that is actuated in an upwards and downwards movement by a set of desmodromic cams, said main swivel arm having a hollow cylindrical portion, a sliding sleeve is mounted on an articulated joint joined to a sliding support that enables a linear movement in a direction parallel to the axis of the hollow cylindrical portion of the main swivel arm when the latter is in the position determined by the position of the auxiliary piston closest to the cylinder head; the secondary piston is connected to one end of a secondary swivel arm, which is connected at the other end thereof to a respective plunger parallel to the plunger and that is in turn actuated in an upwards and downwards movement by a corresponding set of desmodromic cams, the secondary swivel arm being mounted on an articulated joint that is located inside the hollow cylindrical portion of the main swivel arm.

* * * * *